United States Patent
Lettenbauer et al.

(10) Patent No.: US 8,045,806 B2
(45) Date of Patent: Oct. 25, 2011

(54) METHOD AND DEVICE FOR IDENTIFYING MATERIAL BOUNDARIES OF A TEST OBJECT

(75) Inventors: Hubert Lettenbauer, Unterkochen (DE); Andreas Lotze, Dresden (DE); Steffen Kunzmann, Dresden (DE)

(73) Assignee: Carl Zeiss Industrielle Messtechnik GmbH, Oberkocken (DE)

( * ) Notice: Subject to any disclaimer, the term of this patent is extended or adjusted under 35 U.S.C. 154(b) by 1002 days.

(21) Appl. No.: 11/942,349

(22) Filed: Nov. 19, 2007

(65) Prior Publication Data

US 2008/0089589 A1 Apr. 17, 2008

Related U.S. Application Data

(63) Continuation of application No. PCT/EP2006/004625, filed on May 11, 2006.

(30) Foreign Application Priority Data

May 17, 2005 (DE) .................. 10 2005 023 376

(51) Int. Cl.
*G06K 9/00* (2006.01)
(52) U.S. Cl. ................... 382/190; 382/154; 382/285
(58) Field of Classification Search .................. 382/141, 382/154, 199, 285; 707/2, 104.1
See application file for complete search history.

(56) References Cited

U.S. PATENT DOCUMENTS

| | | | |
|---|---|---|---|
| 4,644,583 A | 2/1987 | Watanabe et al. | |
| 5,555,352 A * | 9/1996 | Lucas | 345/423 |
| 6,125,164 A | 9/2000 | Murphy et al. | |
| 6,600,808 B2 | 7/2003 | Takada et al. | |
| 6,631,364 B1 | 10/2003 | Rioux et al. | |
| 6,658,145 B1 * | 12/2003 | Silver et al. | 382/149 |
| 6,771,262 B2 * | 8/2004 | Krishnan | 345/424 |
| 6,836,567 B1 * | 12/2004 | Silver et al. | 382/209 |
| 6,928,137 B2 | 8/2005 | Bruder et al. | |
| 7,058,156 B2 | 6/2006 | Bruder et al. | |

(Continued)

FOREIGN PATENT DOCUMENTS

DE 10238267 A1 3/2003

(Continued)

OTHER PUBLICATIONS

Einar Heiberg, "Automated Feature Detection in Multidimensional Images", Dissertation No. 917, Dec. 2004, pp. 1-70, Linköpings Universitet, Sweden.

(Continued)

*Primary Examiner* — Stephen Koziol
(74) *Attorney, Agent, or Firm* — Laurence A. Greenberg; Werner H. Stemer; Ralph E. Locher (57) ABSTRACT

A method and a device determine material interfaces in a test object. The novel method generates three-dimensional image data of the test object or uses already existing three-dimensional image data of the test object. Image values of the image data are, or were, obtained by invasive radiation. An evaluation line for evaluating the image data relative to the test object is determined, a location of a material interface of the test object is determined by evaluating the image data of image values along the evaluation line so that the value of the first partial derivative of the image values in the direction of the evaluation line has a local maximum at the location of the material interface.

13 Claims, 6 Drawing Sheets

U.S. PATENT DOCUMENTS

| | | | |
|---|---|---|---|
| 7,251,366 B1 * | 7/2007 | Silver et al. | 382/209 |
| 2001/0055016 A1 | 12/2001 | Krishnan | |
| 2004/0131142 A1 | 7/2004 | Bruder et al. | |
| 2004/0141581 A1 | 7/2004 | Bruder et al. | |

FOREIGN PATENT DOCUMENTS

| | | |
|---|---|---|
| DE | 10245116 A1 | 4/2004 |
| DE | 10248770 A1 | 5/2004 |

OTHER PUBLICATIONS

E. Brandt, et al., "Segmentation of Echocardiographic Image Sequences Sequences Using Spatio-temporal Information", 1999, pp. 71-149, MICCAI 99, vol. 1679 of Lecture Notes in Computer Science, Springer-Verlag, Cambridge, UK.

G. Szekely, et al., "Segmentation of 3D Objects from MRI Volume Data Using Constrained Elastic Deformations of Flexible Fourier Surface Models", Apr. 3-6, 1995, pp. 1-12, published in the Proceedings of the First International Conference on Computer Vision, Virtual Reality and Robotics in Medicine, Nice, France.

Olivier Monga, et al., "3D Edge Detection Using Recursive Filtering: Application to Scanner Images", Jan. 1991, pp. 76-87, vol. 53, No. 1, CVGIP: Image Understanding, Duluth, MN.

Olivier Monga, et al., "Recursive Filtering and Edge Tracking: Two Primary Tools for 3D Edge Detection", Aug. 1991, pp. 203-214, vol. 9, No. 4, Butterworth-Heinemann Ltd., France.

Isaac Cohen, et al. "Using Deformable Surfaces to Segment 3-D Images and Infer Differential Structures", Sep. 1992, vol. 56, No. 2, CVGIP Image Understanding, Duluth, MN.

F. Leitner, et al., "Complex Topology 3D-objects Segmentation", 1991, pp. 16-26, vol. 1609, Model-Based Vision and Development and Tcols, La Tronche, France.

* cited by examiner

METHOD AND DEVICE FOR IDENTIFYING MATERIAL BOUNDARIES OF A TEST OBJECT

CROSS-REFERENCE TO RELATED APPLICATIONS

This application is a continuation, under 35 U.S.C. §120, of copending international application No. PCT/EP2006/004625, filed May 11, 2006, which designated the United States; this application also claims the priority, under 35 U.S.C. §119, of German patent application No. 10 2005 023 376.7, filed May 17, 2005; the prior applications are herewith incorporated by reference in their entirety.

BACKGROUND OF THE INVENTION

Field of the Invention

The invention relates to a method and a device for identifying material boundaries of a test object. The invention can be applied and/or utilized with advantage in the area of quality control of industrially manufactured objects, especially those manufactured in series production. Particularly advantageous is its use in the inspection of components having complex geometries. Especially, defects in the material (such as undesired hollow spaces or entrapments of another material) or undesired deviations from a predetermined form of an area of material can be identified. One particular concern in the quality control of industrially manufactured objects is the inspection to determine whether dimensions of the test object conform to predetermined production values.

Computer tomography (CT) is used to identify the internal structures of a test object. CT is known primarily in the medical field, however it is also used to measure non-living matter. The process of using CT to generate (spatial) three-dimensional image data, which are reconstructed image data such as are known from German published patent application DE 102 45 116 A1 (cf. U.S. Pat. No. 6,928,137 B2) or from German published patent application DE 102 48 770 A1 (cf. U.S. Pat. No. 7,058,156 B2), is also known. In the reconstruction process, three-dimensional image data are obtained from a plurality of two-dimensional images, which are in turn obtained by rotating the test object in relation to a radiation source and a radiation detector.

Known methods and devices of this type can also be applied and/or utilized in connection with the invention to generate the three-dimensional image data. However the invention is not limited to this.

From US 2001/0055016 A1 a system for generating a three-dimensional image is known, which has an image selector for identifying image elements (voxels) that correspond to a border in the three-dimensional image. The image selector reacts to input from a user. It identifies the border from voxels that have a degree of opacity that is greater than a predetermined threshold value, or identifies the border from voxels that have an opacity gradient that is greater than a predetermined threshold value. This system is intended for use in medical applications.

In three-dimensional image data on industrially manufactured objects, special artifacts occur, which can be attributed especially to adjacent material areas comprised of different materials, to the presence of planar interfaces of material areas, and to straight, sharp edges of material areas. These artifacts occur in the reconstruction of the image values from two-dimensional images that have been recorded from different directions. The artifacts are, for example:

Different image values in areas of the same material, so that the areas appear to have other material properties, and adjacent areas of the same material appear to have a material boundary between them.

Striae, i.e. striated areas with erroneously altered image values within or on the boundary of an area of a homogeneous material.

When fixed threshold values are used, these artifacts can lead to errors in boundary identification. Material boundaries are then identified that are not actually present and/or that are offset by a significant amount of error from the true position of the material boundary.

BRIEF SUMMARY OF THE INVENTION

It is accordingly an object of the invention to provide a method and a device for determining material boundaries in a test object which overcome the above-mentioned disadvantages of the heretofore-known devices and methods of this general type and which permits a precise identification of a material boundary, especially in industrially manufactured objects.

With the foregoing and other objects in view there is provided, in accordance with the invention, a method of identifying material boundaries of a test object, the method which comprises:

acquiring three-dimensional image data of the test object (i.e., generating or uploading existing image data), wherein image values of the image data are obtained or have been obtained using invasive radiation;

defining an evaluation line for evaluating the image data in relation to the test object, the evaluation line extending through a point on an expected boundary surface of a material of the test object and having a direction, at the point, perpendicular to the expected boundary surface, wherein the point and the expected boundary surface are identified from information regarding a desired condition of the test object; and evaluating the image values lying along the evaluation line to thereby determine a location of a material boundary in the test object, such that an amount of a first partial derivative of the image values in a direction of the evaluation line has a local maximum at the location of the material boundary.

In other words, to attain the objects of the invention it is proposed that material boundaries be inspected individually. In this, changes in the image values in the area of the material boundary are especially considered. In order to simplify the evaluation process, especially in terms of amount of effort (e.g. computer calculation time), an evaluation line is defined and image values that lie along the evaluation line are used to identify the material boundary.

In this manner, the location having the greatest change in image values in the direction of the evaluation line can be identified as the location of the material boundary. This is based upon the knowledge that the greatest change and/or the maximum of the partial derivative ordinarily lies at the actual location of the material boundary, despite the aforementioned artifacts.

If, however, a fixed threshold value for the degree of absorption of invasive radiation is used as the criterion, the area of striation that, for example, lies adjacent to a material boundary can also fall under this criterion. If a fixed threshold value for the gradient of the degree of absorption is used as the criterion, the threshold value must be selected to be small enough that all conceivable material boundaries can be identified. For example, two materials that have a relatively small absorption rate difference can border one another at a material boundary. Thus when striae are present at a material boundary, in some cases two material boundaries are identified.

In the solution according to the invention, however, the location having the greatest partial derivative value is identified as the location of the material boundary. Especially, with this a localized area that extends in the direction of the evaluation line can be defined. If a plurality of localized maxima of the first partial derivative lie in the localized area, the location with the greatest maximum is identified as the location of the material boundary. In this, the localized area corresponds, for example, to a segment of the evaluation line. Therefore, in this case the localized area can be defined by a predetermined length of the segment. Especially when information regarding the desired condition of the test object is used (this will be discussed in greater detail in what follows), the selected length of the segment can be short enough that it is only slightly greater than the maximum expected positional error of material boundaries of the object. Thus the material boundary identification can be purposely limited to an expected range. For example, the length of the segment can be 100 or fewer than 100, preferably 50 or fewer than 50, length units, with one length unit being defined as the reciprocal value of the local resolution of the image data. Depending upon the resolution, one length unit is, for example, a value ranging from 0.02 µm to 0.05 mm.

As an alternative or in addition to the use of a localized area in which an absolute maximum is used as the criterion, in one embodiment of the method a location is identified as the location of a material boundary only when the amount of the first partial derivative of the image values in the direction of the evaluation line exceeds a predetermined threshold value (limiting value), or is greater than or equal to the threshold value. In this manner, the erroneous identification of material boundaries caused by striation or by other fluctuations in the image values can be avoided.

Especially, the image data have image values that contain information on at least one material property of the test object, such as a capacity of the material to absorb the invasive radiation that is used and/or a density of the material. The three-dimensional image data can also have image values that contain information regarding a corresponding material property of a second material (and any other materials) in the test object and/or regarding any hollow spaces or recesses. "Material" is therefore also understood to include air, some other gas or a vacuum in the test object.

As a rule, the image values are or can be allocated to an absolute position or a relative position of a location or volume range. Formulated in more general terms, the various image values are in a spatial relationship with one another that corresponds to the actual spatial relationship of the partial areas of the test object. Especially, the image data, such as are known, for example, from the above-mentioned DE 102 48 770 A1 and U.S. Pat. No. 7,058,156 B2, can have discrete volume elements (voxels) to which the at least one material property, or a value derived from the property, is assigned as the image value.

Invasive radiation is especially x-ray radiation, which is particularly advantageous for the examination of industrially manufactured measured objects, especially an examination within the framework of a quality assurance step in a series production of the objects, because it has a high penetration depth in a multitude of materials. However, other invasive types of radiation, such as positron radiation and/or electron radiation, can also be used. The fields and signals used in magnetic resonance measurement are also included under the term "invasive radiation".

Preferably, the intensity of the radiation (radiation flux density) is preferably used as the primary measured variable, which is present even after the radiation has passed through the test object. In this manner, the absorption or extinction of the radiation can be determined. Alternatively or additionally, however, other effects such as the bending and/or reflection of the radiation at material boundaries can also be used to generate the three-dimensional image data.

The evaluation line for evaluating the image data is defined in relation to the test object. In this, it is also understood that the position and orientation of the test object in relation to a system of coordinates is known, and the evaluation line is defined in relation to the system of coordinates.

Especially, the position and orientation of the evaluation line are defined in relation to the test object. In this, the position and orientation need not be indicated explicitly. Rather, an equivalent definition is sufficient, such as the specification of a plane to which the evaluation line is perpendicular, and the specification of a point on the plane, at which the evaluation line intersects the plane.

Image values that lie along the evaluation line are understood not only as image values whose assigned location lies directly on the evaluation line or whose assigned volume range (e.g. voxels are assigned to a volume range) is penetrated by the evaluation line. At least optionally, image values whose assigned location or volume range lies some distance from the evaluation line can also be taken into consideration. Especially, with a preferred embodiment of the method, in the evaluation of the image values that lay along the evaluation line the image values are weighted based upon a distance of the image values from the evaluation line. This is achieved especially in that, for example, in the interpolation of image values a continuous (no longer positionally discrete) pathway of the image values transversely to the evaluation line is determined. Thus it can be taken into account if the evaluation line extends closer to or farther from the assigned locations of image values, and/or does not pass through the centers of volume ranges (especially if its pathway is inclined in relation to the axes of the system of coordinates of the image data).

According to the invention, to determine the location of a material boundary the condition has been established that the amount of the first partial derivative of the image values in the direction of the evaluation line has a local maximum at the location of the material boundary. However, this does not mean that in the implementation of the method the first partial derivative must necessarily be calculated.

Instead, an equivalent criterion can also be used, for example that the second partial derivative in the direction of the evaluation line is zero (inflection point criterion), or the differences in the image values can be evaluated directly, for example with positionally discrete image data (such as voxels). The greatest difference in an image value as compared with its neighbors that lie in the direction of the evaluation line corresponds to a maximum amount of the first partial derivative. In this, not only can the difference between immediate neighbors be observed, rather, for example, for each image value the differences within a localized area of the variable of n distances between direct neighbors and/or n edge lengths of a voxel can be considered, wherein n is a whole number greater than 1.

Especially, the three-dimensional image data contain information regarding an internal structure of the test object. In this, the term "internal" structure encompasses any boundary structure that is formed by one or more material areas of the test object, including the outer surface of the test object. In the latter case, the internal structure has, for example, a material area made of a single material into which the invasive radiation penetrates.

Especially, the invasive radiation can be used to determine the shape and position of edges and/or surfaces of the material or materials of the test object. Edges and surfaces refer to outer and inner boundaries of the material or materials. Conversely, a boundary of the material involves, for example, an outer surface, an inner surface (for example adjacent to a hollow space) or a transition area from one material to another material.

In one particularly preferred embodiment of the method, the evaluation line is defined such that it passes through a point on an expected boundary surface of the material and has a direction that is perpendicular to the expected boundary surface at the point. Preferably, the point and the expected boundary surface are determined from information regarding a desired condition of the test object, especially from CAD data (Computer Aided Design) on the test object. Information regarding a desired condition of the test object ordinarily is already available for industrially manufactured objects. Especially, if the desired condition is to be compared with the actual condition, the information regarding the expected position of the point can also be used to determine the error when the point and/or the boundary surface deviates from the desired condition.

The use of information regarding the desired condition has the additional advantage that only a limited range of the three-dimensional image data needs to be evaluated. For example, for each of a plurality of areas of the test object, at least one point on an expected boundary surface is identified, for which an evaluation line is then defined. A determination of the entire pathway of the boundary surface is not necessary for quality control.

The use of information regarding the desired condition has the further advantage that areas with striation or with image value variations in which no material boundaries are expected can be disregarded. Thus without previous knowledge regarding the test object, no "phantom" material boundaries will be identified, in contrast to a systematic evaluation.

Because the evaluation line extends perpendicular to the expected boundary surface, especially high values for the first partial derivative of the image values can be expected. In general, the differences in the first partial derivative in the direction of the evaluation line are therefore particularly great. This increases the reliability of the identification of the location of the material boundary.

Especially to reduce the effect of statistical variations and other causes of noise in the evaluation result, in obtaining the image values differences between positionally adjacent image values can be partially compensated for or partially prevented, especially through digital filtering. Suitable filtering methods are known in the art and are described, for example, in DE 102 48 770 A1 and U.S. Pat. No. 7,058,156 B2, the full content of which is incorporated here through referencing. "Partially" refers to the fact that the differences are, of course, not fully compensated for, as otherwise the information for identifying the material boundary would be eliminated. Alternatively or additionally, the noise can be eliminated or reduced in the evaluation of the image values that lie along the evaluation line. Especially, differences in positionally adjacent image values that lie along the evaluation line, and/or differences in values that are derived from the image values that lie along the evaluation line, are partially compensated for in identifying the location of the material boundary, especially through digital filtering. A Gaussian filter is especially well suited for this, which is applied sliding in the direction of the evaluation line. Filtering in the evaluation of the image values that lie along the evaluation line has the advantage that the filtering process needs to be performed only for the respective evaluation area, and then only linearly, in the direction of the evaluation line. Thus, when a computer is used, computing time and/or computing output can be saved.

Even when filtering is performed, differences between adjacent image values can occur, which lead to a local maximum in the first partial derivation in the direction of the evaluation line, although at the location of the local maximum there is no material boundary. One reason for this is variations in the material properties and/or non-homogeneities within an area that is made of the same material. For this reason especially, it is preferable for a location to be identified as the location of a material boundary only when the amount of the first partial derivation of the image values in the direction of the evaluation line exceeds an established threshold value, or is greater than or equal to the threshold value. In this, the threshold value of the partial derivation need not be used. Instead, equivalent threshold values can also be used. For example, regardless of the concrete process method used to determine the location of the material boundary, it can be sufficient for an equivalent threshold value for a difference between adjacent image values to be defined, and the distance of the assigned locations of the image values to be given.

Particularly preferred is an embodiment of the method in which at least a first location of the material boundary is determined according to the above-described method, wherein a plurality of additional locations are identified on a boundary surface of the same material boundary, wherein it is determined whether the evaluation line extends at the first location perpendicular to the boundary surface that is defined by at least the other locations, and/or a measurement of the deviation of the evaluation line from surface normal is determined. In this manner, an error in the determination of the first location can be identified and/or corrected. It is especially possible to repeat the identification of the first location using a changed evaluation line, which extends in the direction of surface normal. This process method of verification and re-identification can be repeated multiple times.

The verification of the direction of the evaluation line is based upon the idea that the maximum of the first partial derivative in the direction of the evaluation line is based upon the angle at which the evaluation line intersects the boundary surface (is proportional to the cosine of the angle of the evaluation line to surface normal). In the case of very large angles from surface normal, it is possible that the material boundary may not be recognized and/or may be viewed as a normal variation in the image values.

The other locations, which are preferably adjacent to the first location, can in turn be identified at least in part using an evaluation line, for example. Alternatively or additionally, such additional locations on the boundary surface can be identified by the fact that they have the same image value as the image value of the first location (especially within a tolerance range).

The scope of the invention further includes a computer program, which implements the method of the invention in one of its embodiments in sequence on a computer or computer network. The three-dimensional image data are especially stored in a permanent memory bank in the computer or the computer network, and/or are supplied to the permanent memory bank via an interface. The computer or the computer network can also be used to generate the three-dimensional image data (in the case of CT, for example, by means of so-called re-projection).

Also within the scope of the invention is a computer program with program code elements for implementing the method of the invention in one of its embodiments when the program is implemented on a computer or computer network. Especially, the program code elements can be stored on a computer-readable data storage medium.

Further within the scope of the invention is a data storage medium on which a data structure is stored, which, after being loaded into a working and/or main memory of a computer or computer network, is capable of implementing the method of the invention in one of its embodiments.

Also within the scope of the invention is a computer program product with program code elements stored on a machine-readable carrier, configured to implement the method of the invention in one of its embodiments when the program is implemented on a computer or computer network.

In the concept of a computer program product, the program is understood as a commercially available product. In principle, it can be available in any form, for example on paper or on a computer-readable data storage medium, and can especially be distributed via a data transfer network.

With the above and other objects in view there is also provided, in accordance with the invention, a device for identifying material boundaries of a test object, the device comprising:

an interface for receiving three-dimensional image data of the test object, wherein image values of the image data have been obtained by way of invasive radiation;

a parameterization device for defining an evaluation line in relation to the test object, the parameterization device defining an evaluation line extending through a point on an expected boundary surface of the material, and having a direction at the point perpendicular to an expected boundary surface, the parameterization device identifying the point and the expected boundary surface from information on a desired condition of the test object; and an evaluation device connected to the interface and to the parameterization device, the evaluation device being configured to identify a location of a material boundary of the test object by evaluating image values lying along the evaluation line, so that an amount of a first partial derivative of the image values in the direction of the evaluation line has a local maximum at the location of the material boundary.

The parameterization device and the evaluation device can especially be implemented in software that is configured to evaluate the three-dimensional image data. However, implementations comprising hardware (e.g. with specially configured microelectronic components) or combinations of hardware and software are also possible.

Other features which are considered as characteristic for the invention are set forth in the appended claims.

Although the invention is illustrated and described herein as embodied in method and device for Identifying material boundaries of a test object, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
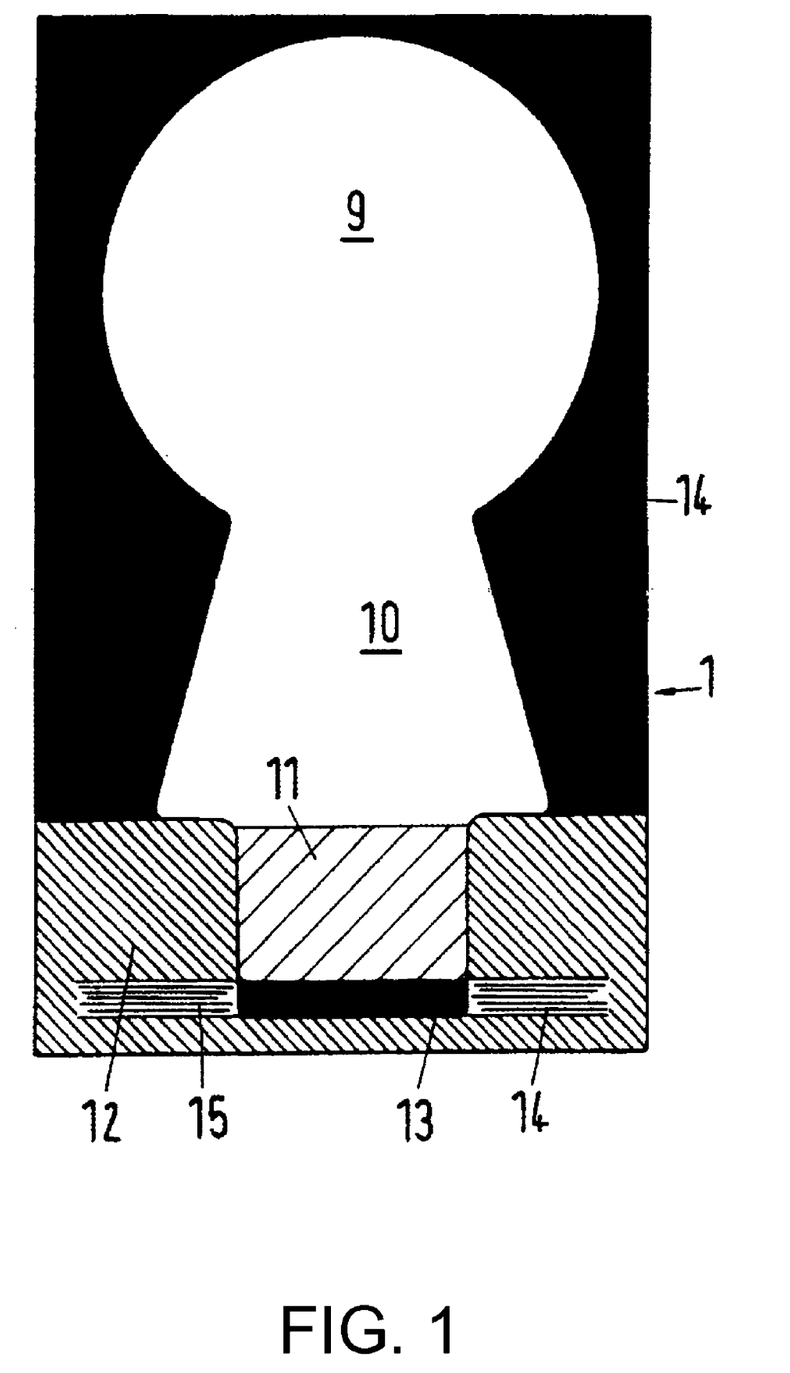
FIG. 1 a sketch schematically representing a two-dimensional planar section generated from a set of three-dimensional image data on a test object.

Referring now to the figures of the drawing in detail and first, particularly, to FIG. 1 thereof, the image of a test object 1 shown in FIG. 1 is rectangular. In practice, for images of this type, gray-scale representation is used. In this, areas are darker the less radiation they have absorbed. However, artifacts occur, which will be described in greater detail in what follows.

The dark, nearly black areas in FIG. 1 correspond to air that surrounded the actual test object 1 during recording of the image data. The test object 1 is comprised of a truncated cone 10 with a spherical head 9 arranged above it. The truncated cone and the head form the outlines of a customary playing piece for a board game. However, a base piece 11, also made of the same material as the truncated cone 10 and the head 9, extends downward from the truncated cone 10. Between the truncated cone 10 and the base piece 11 there is no material boundary, as is illustrated according to FIG. 1. Actually, however, there are material boundaries from the base piece 11 downward to a layer of air 13, shown in black, which extends beneath the base piece 11 along its entire base surface, and to the right and the left to a base plate 12 of a different material. The material boundaries of the base piece 11 to the right and the left are each recognizable by a boundary line that extends vertically upward. The base plate 12 fully accommodates the base piece 11 in a correspondingly shaped recess. The base plate 12 has an approximately rectangular external contour in the sectional representation.

The sectional image represented in the sketch of FIG. 1 was generated from computer tomographic image data. The original sectional image was a gray-scale image. In the CT imaging process, the test object was irradiated by radiation projecting approximately horizontally. The test object was also rotated around an axis extending in a vertical direction. Therefore information regarding the base piece 11 was obtained only using radiation that also penetrated the base plate 12 in the same radiation pathway. As a result, the elevated gray values (as indicated by crosshatching) for the base piece 11 are obtained, even though the base piece 11 absorbed precisely as much radiation per volume unit as the truncated cone 10 and the head 9. Furthermore, to the right and the left sides of the layer of air 13, striations 14, 15 formed, which in the gray-scale image, which corresponds to FIG. 1, appear brighter than their surrounding area. The striations extend in a stripe pattern in the same vertical position as the layer of air 13. They are indicated in FIG. 1 by lines.

At this point, a particularly preferred embodiment of the method of the invention will be described. In this, reference will be made to FIG. 3.

Figure 3:
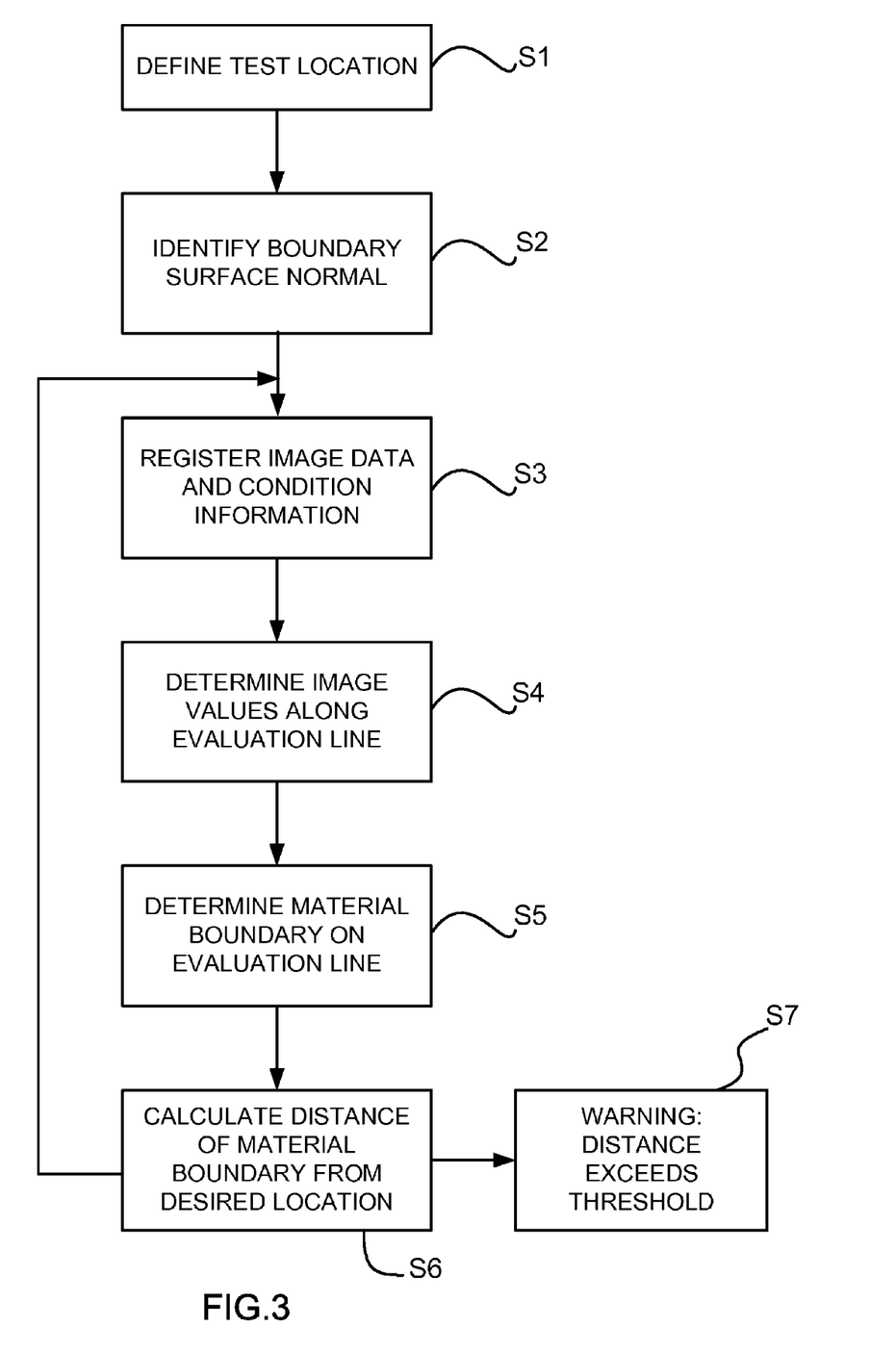
FIG. 3 is a flow chart outlining process steps in a particularly preferred embodiment of the method of the invention.

In Step S1, desired condition information regarding a desired condition of the test object (e.g. CAD data) is used to define test locations at expected material boundary surfaces of the test object.

In the subsequent Step S2, for each test location the corresponding boundary surface normal is identified for each test location as the evaluation line, i.e. a line that extends perpendicular to the boundary surface (or its direction) and intersects the boundary surface at the respective test location.

Figure 2:
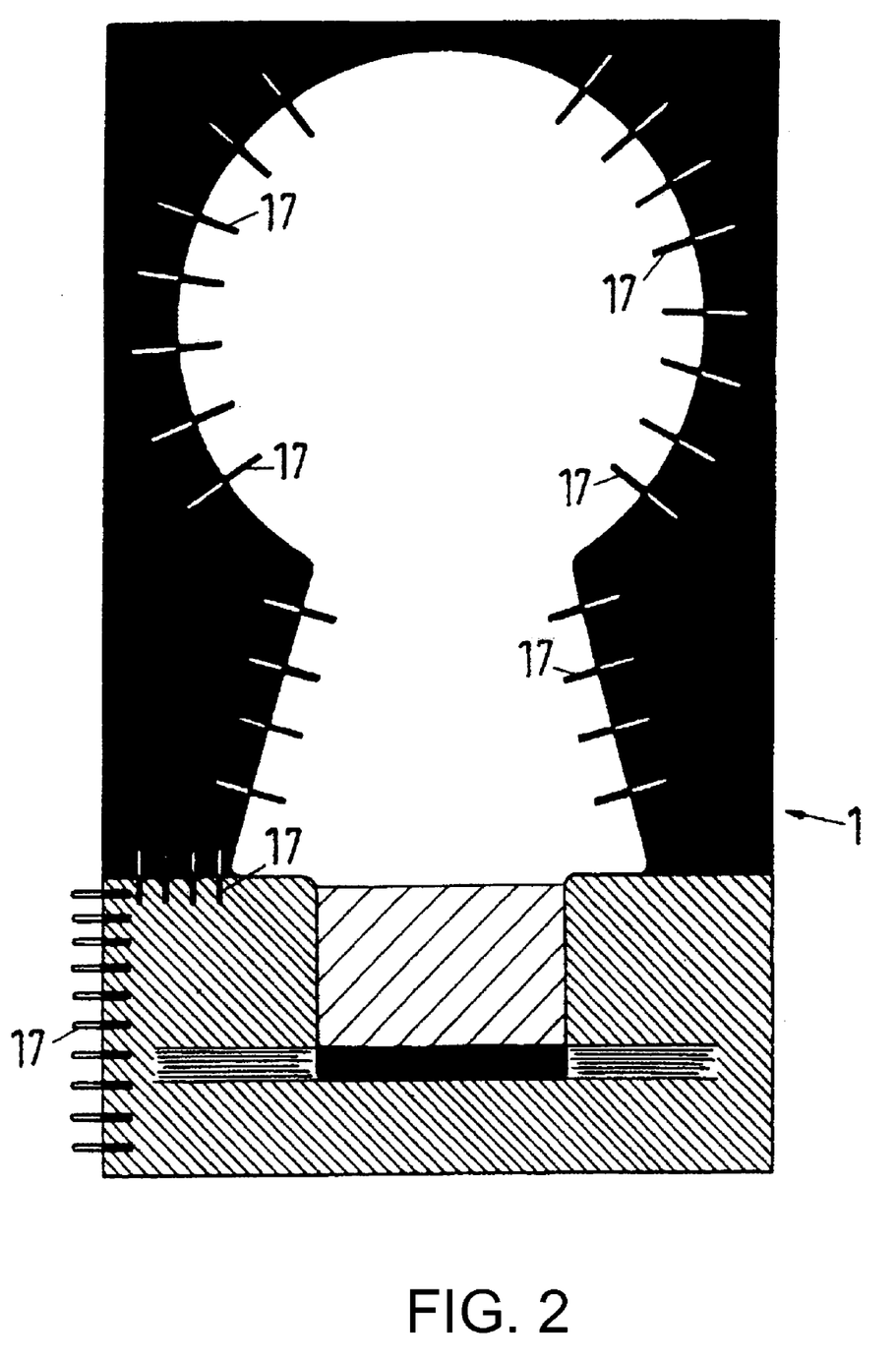
FIG. 2 is the sectional representation of FIG. 1 with a plurality of evaluation lines.

The result of Steps S1 and S2 is schematically represented in FIG. 2. Shown are a plurality of evaluation lines, a number of which are identified by the reference number 17. The identification according to the invention of a location of one material boundary each is implemented along the evaluation lines, as described in what follows.

Steps S1 and S2 can be performed only a single time for a specific object type. With this, for each test object that is to be produced and inspected base upon the object type, a set of test locations, each with an allocated evaluation line, is available. The subsequent steps can therefore be repeated as often as desired for a test object. This is indicated in FIG. 3 by a corresponding loop.

In Step S3, three-dimensional image data on a test object, e.g. the test object 1 from FIG. 1, and the desired condition information on the desired condition of the test object are registered, i.e. their systems of coordinates are referred to one another. As a result, image points and directions of the three-dimensional image data can then be identified and/or defined, which correspond to the defined test locations and evaluation lines. This is dependent only upon the correct positioning and orientation of the evaluation lines. However, the test locations need not necessarily be transferred to the set of three-dimensional image data.

For purposes of registration, especially characteristic form features of the test object can be used as markers. When three-dimensional desired condition data (such as CAD planning data on the test object) are available, it is also possible to perform a registration according to the method for maximizing the mutual image information, the desired condition data and the three-dimensional image data. A suitable registration process is also known, for example, from U.S. Pat. No. 6,125,164. There, the method is used to register a patient in reference to three-dimensional CT data for purposes of radiation treatment. In this, digitally reconstructed radiographic images (so-called DRR) are generated from the CT data, and compared with an image of the current position and orientation of the patient. From this, especially information regarding a deviation of the instantaneous position and orientation of the patient can be derived. The method described in U.S. Pat. No. 6,125,164 is hereby fully incorporated by reference into the present specification. In this, the CT data correspond to the three-dimensional image data, and the current position and orientation of the patient correspond to the information on the desired condition of the test object. As a result, the difference in position and orientation between the two data sets can be minimized, so that a registration takes place.

Step S3 and the subsequent steps can also be performed separately for each evaluation line.

In Step S4, the image values that lie along the evaluation line are then determined for the evaluation line or for each evaluation line. In this, one concrete example, which is described in greater detail in reference to FIG. 4 and FIG. 5, is based upon three-dimensional image data that are resolved into voxels.

Figure 4:
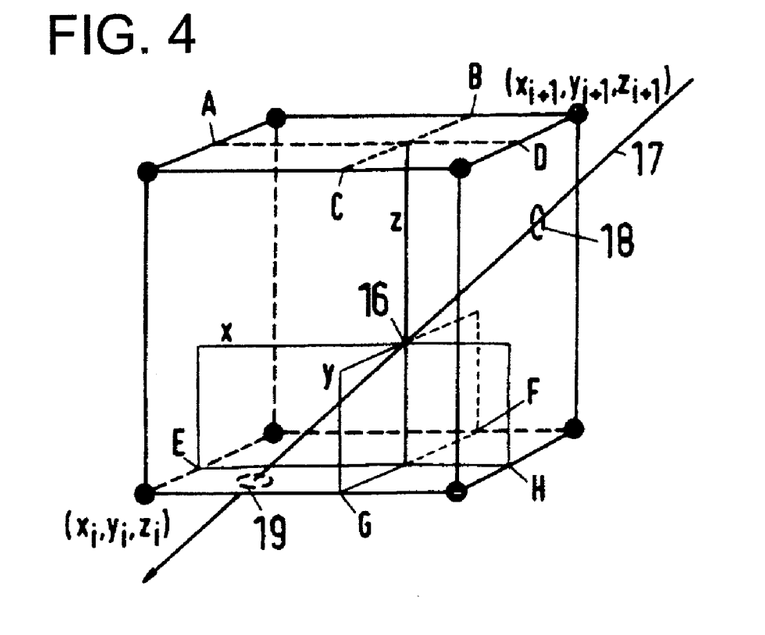
FIG. 4 is a volume unit illustrating the weighting of image values that lie along the evaluation line.
Figure 5:
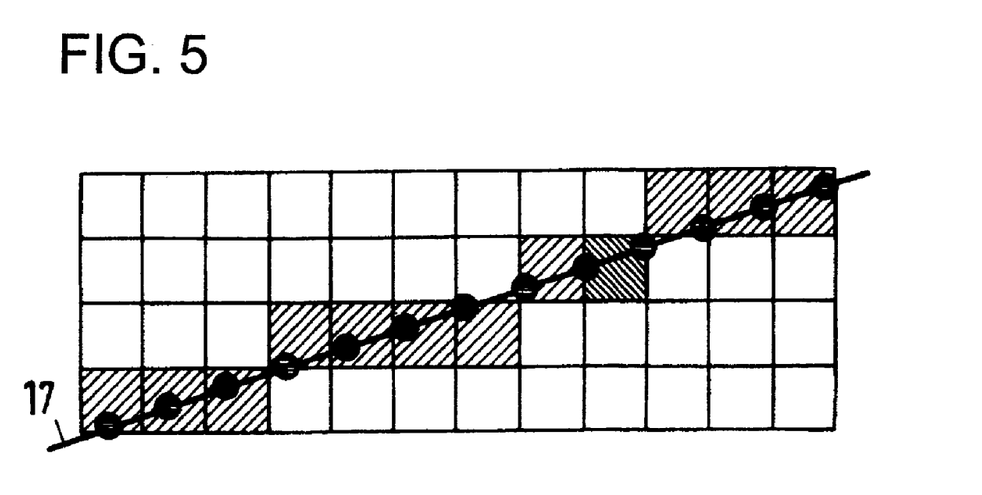
FIG. 5 is a simplified, two-dimensional representation illustrating how points on the evaluation line are determined.

FIG. 4 shows a volume unit, namely a die, with the three-dimensional image data. Each of the corner points of the die defines a location in the system of coordinates of the three-dimensional image data to which an image value is assigned. The representation can also be interpreted to mean that each of the corner points of the die represents the center point of a voxel of the three-dimensional image data. The evaluation line is again identified by the reference symbol 17 and extends in FIG. 4 from the upper right to the lower left, wherein, according to the three-dimensional representation it also extends from the top at the rear to the bottom at the front. This is indicated by the intersection points 18 (in the right lateral surface of the volume unit) and 19 (in the base of the volume unit). For equidistant points on the evaluation line 17, values for determining the location of the material boundary are to be determined, which are identified by weighting from the image values that lie along the evaluation line 17. One of these points, namely point 16, occurs in the represented volume unit. For a two-dimensional case, the principle of equidistant points (represented by black circles) on the evaluation line 17 is represented in FIG. 5. In this, it can especially occur that more than one of the points falls within a volume unit (represented in FIG. 5 by squares). In other cases, it is not necessary for a point to fall in each volume unit. If this is the case, however, available information is not utilized. The distance between the points on the evaluation line 17 therefore preferably amounts to one unit of length in the three-dimensional image data (e.g. equal to the length of one edge of the die).

The image value for the point 16 in FIG. 4 (and correspondingly for all other points on the evaluation line 17) is preferably determined using trilinear interpolation of the image values (with respect to the three coordinate axes) at the corner points of the die, e.g. according to the following process: First the point 16 is projected perpendicular onto eight sections of the edges of the die. In this, in each case, four of the edges form a lateral surface of the die. The two lateral surfaces, each of which is surrounded by four edges, lie opposite one another. For each of the corresponding projected points A through H (see FIG. 4), the linearly interpolated image values of the image values at the two corner points of the edge are determined, using the equation $$W_{int} = W_{e1}*a + W_{e2}*(1-a),$$

wherein $W_{int}$ is the interpolated image values at the projected point, wherein $W_{e1}$ is the image value of the one corner point, and wherein $W_{e2}$ is the image value of the second corner point. In a corresponding manner, interpolation can be continued, wherein image values for six points, which are obtained by the perpendicular projection of the point 16 onto the lateral surfaces of the die, are interpolated. Three further interpolations of pairs of points, each on opposite lateral surfaces, can then be performed, and in this manner the image value of the point 16 can be determined. For example, the sum of the three interpolations is formed and is used as the trilinearly interpolated image value.

This and other methods that employ a weighting of different image values that lie along the evaluation line take into account the distance of the image values from the evaluation line, and therefore produce more precise results in identifying the location of the material boundary on the evaluation line.

As a result of Step S4 (regardless of whether or not a weighting is performed), image values are obtained, which are based solely upon a localized dimension. In this, the above-described weighting is preferably performed. However, the procedure may also be different. For example, in each case only the image value of the corner point that is next to the point on the evaluation line may be accepted.

Figure 6:
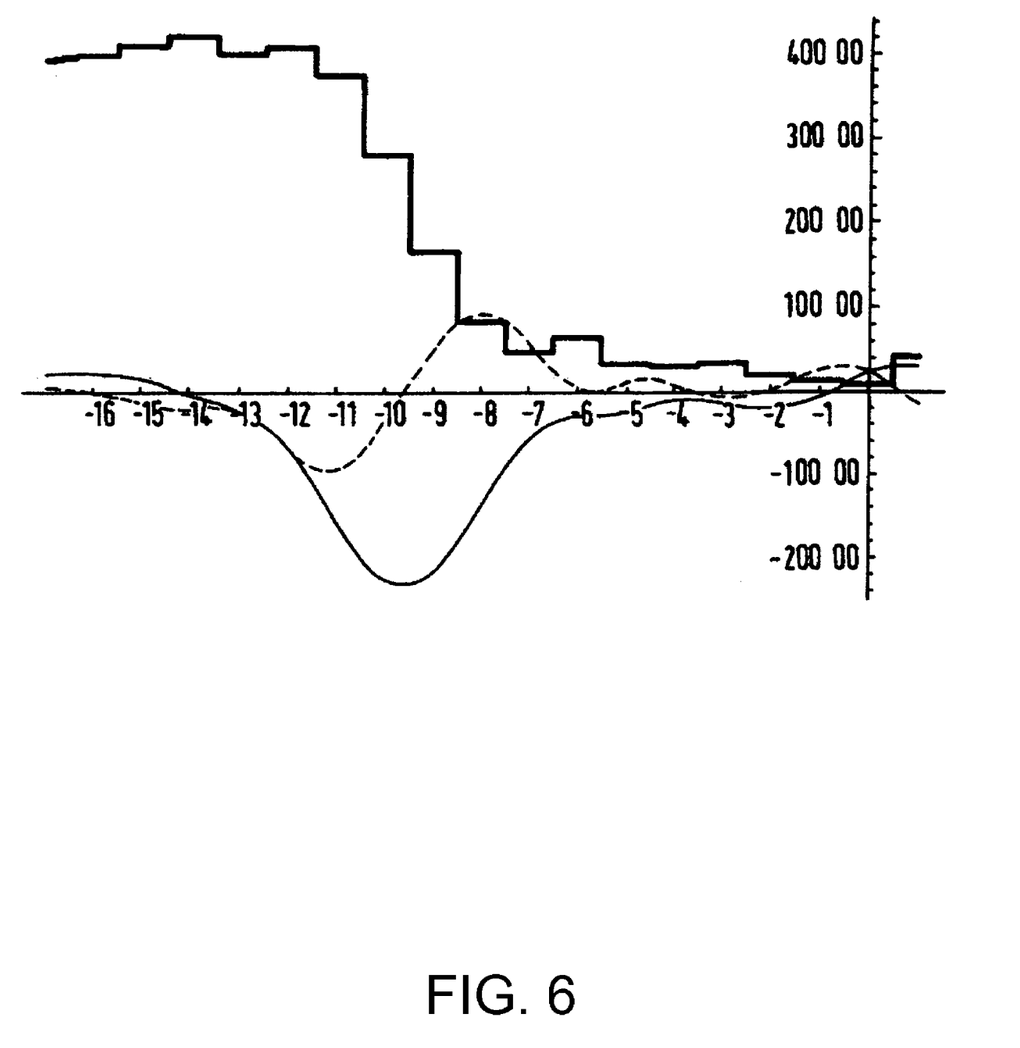
FIG. 6 is a diagram with image values as a function of the location on the evaluation line.

In Step S5, the location of the material boundary on the evaluation line is then determined. In this, a smoothing of differences in the image values (filtering, for example using a Gaussian filter) can optionally be performed. As an example of the information that is obtained from the preceding steps, FIG. 6 shows a diagram in which image values (y-axis, values ranging from approx. 0 to 10,000 in any units) are plotted on the coordinate axis (x-axis) defined by the evaluation line. The image values in this are a function of the ordinal numbers (represented here by approx. −17 to +1) of the points on the evaluation line. In the representation, the function is a stepped function, wherein each step level corresponds to an image value.

Further, in FIG. 6 the first partial derivative (continuous line) and the second partial derivative (dashed line) of the image values in the direction of the evaluation line are represented, which have been formed, for example, according to the linear interpolation of the stepped function. Approximately at the point −9.6, i.e. between the points having the ordinal numbers −9 and −10, lies a zero point for the second partial derivative. This is equivalent to a maximum amount for the first partial derivative. The location on the evaluation line that corresponds to this point is identified as the location of the material boundary.

In the optional step S6, a calculation of the distance between the identified location of the material boundary and the test location determined from the desired value information is performed. If the distance exceeds a predetermined threshold value, a fault indication can be given (Step S7).

Figure 7:
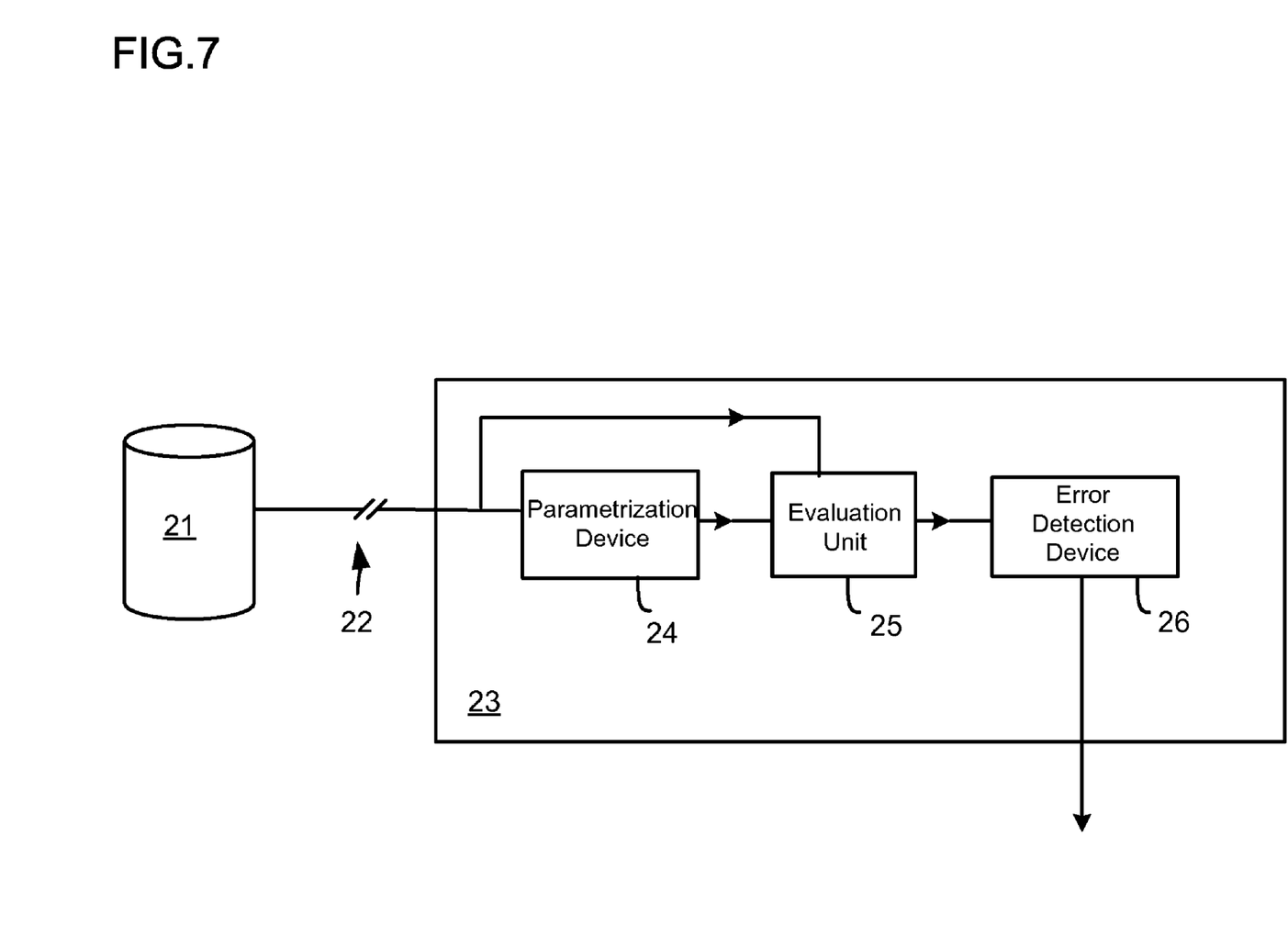
FIG. 7 is a schematic representation of a device for identifying material boundaries.

FIG. 7 shows a device for identifying material boundaries of a test object, which can especially be configured to implement the above-described, particularly preferred embodiment of the method.

Three-dimensional image data and desired condition information on the test object are stored in a permanent data storage unit 21. A device 23 for identifying material boundaries is connected via an interface 22 to the data storage unit 21. The device 23 has a parameterization device 24, which is capable of retrieving and/or downloading information on the desired condition from the data storage unit 21 (e.g. in a working memory, not shown here) via the interface 22.

An evaluation unit 25 is connected to the interface 22 and the parameterization device 24. It is configured to determine the location of the material boundary on the evaluation line that is predetermined by the parameterization device 24 (e.g. according to the above-described steps S3 through S6).

Alternatively, the results from the parameterization device 24 can be stored again in the data storage unit 21, so that a connection between the parameterization device 24 and the evaluation device 25 is not absolutely necessary.

An error detection device 26 is connected to the evaluation device 25 and is configured to detect and report any errors in the position of the location of the material boundary from the results from the evaluation device. Alternatively or additionally, the parameterization device 26 is configured to implement the above-described method in which a plurality of additional locations are identified on a boundary surface of the same material boundary, wherein it is determined whether the evaluation line extends at the first location perpendicular to the boundary surface defined by at least the other locations, and/or a measurement of the deviation of the evaluation line from surface normal is determined.

The invention claimed is:

1. A method of identifying material boundaries of a test object, the method which comprises:
   acquiring three-dimensional image data of the test object, wherein image values of the image data are obtained or have been obtained using invasive radiation;
   defining an evaluation line for evaluating the image data in relation to the test object, the evaluation line extending through a point on an expected boundary surface of a material of the test object and having a direction, at the point, perpendicular to the expected boundary surface, wherein the point and the expected boundary surface are identified from information regarding a desired condition of the test object; and
   evaluating the image values lying along the evaluation line to thereby determine a location of a material boundary in the test object, such that an amount of a first partial derivative of the image values in a direction of the evaluation line has a local maximum at the location of the material boundary.

2. The method according to claim 1, wherein the acquiring step comprises generating the three-dimensional image data of the test object or entering existing three-dimensional image data of the test object.

3. The method according to claim 1, which comprises, when obtaining the image values, partially compensating for differences between positionally adjacent image values.

4. The method according to claim 3, wherein the compensating step comprises compensating through digital filtering.

5. The method according to claim 1, which comprises partially compensating for, at least one of, differences in positionally adjacent image values that lie along the evaluation line, and differences in values derived from the image values that lie along the evaluation line, prior to or during the determination of the location of the material boundary.

6. The method according to claim 5, wherein the compensating step comprises compensating through digital filtering.

7. The method according to claim 1, wherein the step of evaluating the image values that lie along the evaluation line comprises weighting image values based upon a distance of the image values from the evaluation line.

8. The method according to claim 1, which comprises recognizing a location as a location of a material boundary only when the amount of the first partial derivative of the image values in the direction of the evaluation line exceeds a predetermined threshold value.

9. The method according to claim 1, which comprises recognizing a location as a location of a material boundary only when the amount of the first partial derivative of the image values in the direction of the evaluation line is greater than or equal to a predetermined threshold value.

10. A method of identifying material boundaries of a test object, the method which comprises:
    determining at least a first location of a material boundary with the method according to claim 1;
    identifying a plurality of additional locations on a boundary surface of the same material boundary, and thereby determining at least one of:
    whether the evaluation line extends at the first location perpendicular to the boundary surface that is defined by at least the additional locations; and
    a measurement of a deviation of the evaluation line from a surface normal.

11. A non-transitory, computer-readable data medium comprising a computer program having program code elements, which, when executed on a computer or a computer network, are configured to implement the method according to claim 1.

12. A non-transitory, computer-readable data storage medium having stored thereon the program code elements of the computer program according to claim 11.

13. A device for identifying material boundaries of a test object, the device comprising:
    an interface for receiving three-dimensional image data of the test object, wherein image values of the image data have been obtained by way of invasive radiation;
    a parametrization device for defining an evaluation line in relation to the test object, said the parametrization device defining an evaluation line extending through a point on an expected boundary surface of the material, and having a direction at the point perpendicular to an expected boundary surface, said parametrization device identifying the point and the expected boundary surface from information on a desired condition of the test object; and an evaluation device connected to said interface and to said parametrization device, said evaluation device being configured to identify a location of a material boundary of the test object by evaluating image values lying along the evaluation line, so that an amount of a first partial derivative of the image values in the direction of the evaluation line has a local maximum at the location of the material boundary.

* * * * *